UNITED STATES PATENT OFFICE 2,676,946

NONFLAMMABLE MOLDING COMPOSITIONS AND METHOD OF MAKING SAME

John L. McCurdy and Leo Kin, Midland, Mich., assignors to The Dow Chemical Company, Midland, Mich., a corporation of Delaware No Drawing. Application September 11, 1950, Serial No. 184,328

5 Claims. (Cl. 260—45.75)

This invention pertains to certain non-flammable alkenyl aromatic resin compositions and a method of making the same. It is concerned with such compositions in the form of granules, or other solid bodies suitable for use in making molded articles.

By an "alkenyl aromatic resin" is meant a solid polymer of one or more polymerizable alkenyl aromatic compounds. The polymer, or copolymer, comprises in chemically combined form at least 50 per cent by weight of at least one alkenyl aromatic compound having the general formula:

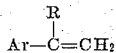

wherein Ar represents an aromatic hydrocarbon radical, or an aromatic halohydrocarbon radical, of the benzene series, and R is hydrogen or the methyl radical. Examples of such alkenyl aromatic resins are the solid homopolymers of styrene, alpha-methylstyrene, ortho-methylstyrene, meta-methylstyrene, para-methylstyrene, ar-ethylstyrene, ar-vinylxylene, ar-chlorostyrene, or ar-bromostyrene; the solid copolymers of two or more of such alkenyl aromatic compounds with one another; and solid copolymers of one or more of such alkenyl aromatic compounds with minor amounts of other readily polymerizable olefinic compounds such as divinylbenzene, methylmethacrylate, or acrylonitrile, etc.

The expressions "non-flammable," and "flameproof" as employed herein, means incapable of burning or sustaining a flame for more than 15 seconds after a composition has been fully heated in an open flame and then removed from the flame used to heat the same. In other words, the compositions provided by the invention are self-extinguishing after removal from a flame used to heat the same.

It is known that the halogen content of halogen compounds often has an effect of reducing the flammability both of the compounds containing the halogen and of other compounds intimately admixed therewith. There are numerous instances in which the flammability of organic materials such as wood, paper, and cellulose derivatives, etc., has been reduced by admixing organic halogen-containing compounds therewith.

It is also known that bromine-containing compounds possess, in most instances, a greater flame-retarding action than do corresponding chlorine-containing compounds. However, the organic bromine-containing compounds differ widely among themselves as regards the flame-retarding action of the bromine contained therein. Many organic bromides have little, or no, flame-retarding action. In fact, many organic bromides are, of themselves, flammable. Also, many organic bromine-containing compounds are excessively unstable to light or heat, and cause discoloration of compositions containing the same upon prolonged exposure to light, or during molding, or decompose to evolve hydrogen bromide and lose their fire-retarding action at temperatures lower than the combustion point of compositions comprising the same. Organic bromides are expensive. In many instances, the proportion of such compounds required to render organic materials treated therewith nonflammable is large and adds considerably to the cost of the products.

Accordingly, although it is known that organic bromides often exhibit a fire-retarding action, it remains a difficult problem to discover such compound, or compounds, which may economically and satisfactorily be used to flameproof a given combustible organic material. The alkenyl aromatic resins with which the invention is concerned are clear, transparent thermoplastic solids and are adapted to the manufacture of molded articles possessing a pleasing appearance and good mechanical properties such as adequate tensile strength, impact strength and dimensional stability, etc. Most dissimilar organic substances, if incorporated in large amount with such resins, e. g. in amount exceeding 10 per cent by weight, impair seriously one or more of such desirable properties of the resins, particularly their dimensional stability at moderately elevated temperatures. Many organic bromides, in particular, are of low compatibility with such resins, or cause discoloration of the resins on prolonged exposure to light, or have little if any flame-retarding action and, when added in considerable amount to the resins, lower greatly the heat distortion temperature of the latter.

Also, organic bromides, if added in large proportion to polystyrene or other alkenyl aromatic resins, add considerably to the cost of the products.

We have discovered that the alkenyl aromatic resins may be rendered non-flammable by incorporating therewith only a small proportion, e. g. from 1 to 10 per cent by weight, of certain organic bromides and that these particular organic bromides are compatible with the resins in proportions sufficient to render the resins non-flammable. During molding, or other fabrication at temperatures above 100° C., of the resin compositions comprising the organic bromides of the invention, and upon prolonged exposure of the compositions to light, the compositions usually develop a yellow, amber, or brownish tint. We have found that such color development may be avoided, or reduced greatly, by also incorporating in the compositions a small amount, e. g. from 0.2 to 2 per cent by weight, of a stabilizer for the organic bromide. The resin compositions comprising the organic bromide and the stabilizing agent are thermoplastic and may be molded to form non-flammable articles of good appearance and having good dimensional stability and satisfactory strength characteristics.

The organic bromides with which the invention is concerned are (1) polyhalogenated alkyl aromatic hydrocarbons of the benzene series containing from 8 to 10 carbon atoms in the molecule and having at least two, but not all, of the hydrogen atoms of each alkyl radical replaced by bromine; (2) saturated polybrominated aliphatic hydrocarbons containing from 3 to 5 carbon atoms and from 3 to 5 bromine atoms and having at least one hydrogen atom per atom of bromine in the molecule; (3) polybrominated monohydric alcohols containing from 3 to 5 carbon atoms and from 2 to 5 bromine atoms and having at least one hydrogen atom per atom of bromine in the molecule; and (4) polybrominated diethyl ether containing one or two bromine atoms on each ethyl radical. Examples of the polyhalogenated alkyl aromatic hydrocarbons are alpha,beta-dibromoethylbenzene, di-(alpha,beta-dibromoethyl) benzene, ar-bromo-alpha,beta-dibromoethylbenzene, ar-chloro-alpha, beta-dibromoethylbenzene and di-(dibromomethyl) benzene, etc. Examples of the saturated polybrominated aliphatic hydrocarbons are 1,2-dibromopropane, 1,2-dibromobutane, 1,2,3-tribromopropane, 1,2,3-tribromobutane and tetrabromopentane, etc. Examples of the saturated polybrominated aliphatic monohydric alcohols are 2,3-dibromopropanol, tribromobutanol, and tetrabromopentanol, etc. Examples of the polybrominated diethyl ethers are di-(beta-bromoethyl) ether, di-(beta,beta-dibromoethyl) ether and di-(alpha,beta-dibromoethyl) ether, etc. Of these several groups of brominated organic compounds, the polybrominated alkyl aromatic compounds, particularly alpha,beta-dibromoethylbenzene, are preferred.

The effectiveness of the above-mentioned organic bromides in reducing the flammability of alkenyl aromatic resins comprising the same is surprisingly great, i. e. it is far greater than would be expected in view of the small proportion of bromine in the resin composition. For instance, an intimate mixture of polystyrene and 10 per cent by weight of hexabromobenzene, which mixture contains 8.7 per cent by weight of bromine, burns and sustains a flame. In contrast, the composition formed by thoroughly admixing 1 per cent by weight of alpha-beta-dibromoethylbenzene with polystyrene contains only about 0.6 per cent of bromine, but is non-flammable, i. e. it will not sustain a flame. Just why the particular organic bromides of the invention are exceptionally effective in flame-proofing the alkenyl aromatic resins is not fully known. It is assumed that they undergo little, if any, decomposition in the resin composition until the latter is heated to about, or somewhat below, the combustion point of the resin; that they then undergo a strongly endothermic decomposition, thereby consuming the heat energy that would otherwise cause combustion and at the same time releasing hydrogen bromide which aids in reducing the flammability of the gases given off; and that the endothermic decomposition of the organic bromide continues for a short time after removal of the composition from an outside flame, thereby serving to quench burning of the composition itself. The fact that the alkenyl aromatic resins are poor conductors of heat probably prevents overheating and decomposition of the organic bromide except at the point of external heating of the resin composition so that there remains a reservoir of undecomposed organic bromide inside the composition and this gradually becomes available to prevent advancement of combustion through a body of the resin composition. Also, the fact that the organic bromides of the invention are fairly compatible with the alkenyl aromatic resins permits ready distribution of the bromides throughout the body of the resins. The thoroughness of distribution of the organic bromides within the resin body undoubtedly contributes to the effectiveness of the flame-retarding action.

A variety of agents capable of stabilizing organic bromides to increase their resistance against decomposition by light or at moderately elevated temperatures, e. g. from 100° to 250° C., are known in the art and may be employed in the compositions of this invention. The stabilizing effect of such agents is believed due, in most instances, to an action of neutralizing traces of acid, e. g. HBr, formed by partial hydrolysis or decomposition of organic halogen compounds, thereby preventing the acid from catalyzing decomposition of the organic halogen compounds, but the invention is not limited by this explanation for the stabilizing effect which is obtained. Although any of the known stabilizers for organic halogen compounds, e. g. ethylene chloride, ethylene bromide, or carbon tetrachloride, etc., may be used in the compositions of the invention, one or more of the following agents: tetralead pyrophosphate, sodium tripolyphosphate (i. e. $Na_5P_3O_{10}$), tetraphenyl tin, 2,6-di-(tert.-butyl)-4-methyl-phenol, sodium lead polyphosphate, benzoic acid, methyl para-hydroxybenzoate, the disodium salt of the calcium chelate of versene acid, and the dilithium salt of versene acid are usually employed. These agents are readily compatible with the resin compositions in amount sufficient to stabilize the organic bromide component of such composition and have little or no adverse effect on the appearance or properties of articles molded from the compositions.

The non-flammable molding compositions of the invention contain 80 per cent by weight or more of an alkenyl aromatic resin. They are prepared by incorporating from 1 to 10, usually from 3 to 5, per cent by weight of one or more of the aforementioned organic bromides and a small amount, e. g. from 0.2 to 2 and preferably from 0.5 to 1 per cent, of one or more of the stabilizing agents, throughout a body of an alkenyl aromatic resin such as polystyrene. Incorporation of these substances in the resin may be accomplished in any of a number of ways. In most instances a non-uniform mechanical mixture of the organic bromide, the stabilizing agent and the granular resin is heated to plastify the resin and the mixture is milled, e. g. on heated compounding rolls or by passage through an extrusion device, to cause thorough distribution of the organic bromide and stabilizing agent throughout the body of heat-plastified resin. If desired, the resin may be heated and milled and the organic bromide and stabilizing agent be added during milling of the heat-plastified resin. Again, the organic bromide and resin may be dissolved together in a relatively volatile mutual solvent such as benzene, toluene, carbon tetrachloride, or ethylene chloride, etc.; the stabilizing agent be dissolved or dispersed in the solution; and the solvent thereafter be distilled or vaporized from the mixture. Other addition agents such as pigments, lubricants, or flow agents, etc., may also be incorporated in the molding compositions by any of the procedures just mentioned, but are not required. Any of the foregoing procedures results in a non-flammable solid resinous composition which may be molded to obtain non-flammable articles.

The following examples describe certain ways for practice of the invention, but are not to be construed as limiting its scope.

EXAMPLE 1

A mixture of 192 parts by weight of granular polystyrene, 6 parts of 1,2-di-(dibromoethyl) benzene and 1 part of sodium tripolyphosphate was passed through a heated extrusion device. During travel through the device the polystyrene was heated to a plastifying temperature and the mixture was milled, or kneaded, by the feed screw of the device, whereby the 1,2-di-(dibromoethyl) benzene and the sodium tripolyphosphate were uniformly incorporated throughout the body of polystyrene. The extruded composition was cooled to harden the same. It was a clear, transparent, colorless solid and was non-flammable. It was injection molded to form articles having the properties just stated.

EXAMPLE 2

This example illustrates employment of a number of the organic bromides of the invention as agents for rendering polystyrene non-flammable. It demonstrates that the non-flammable compositions obtained by incorporating these organic bromides in polystyrene have strength characteristics and a dimensional stability rendering them suitable for the production of molded articles. It brings out the fact that the organic bromides alone tend to discolor the compositions during molding and thereby shows the need for also incorporating a stabilizing agent in the compositions. In each of a series of experiments, 3 per cent by weight of an organic bromide, named in the following table, was uniformly incorporated together with polystyrene by heating the latter to render it plastic and milling the organic bromide into the heat-plastified polystyrene. The polystyrene was of a usual molding quality, i. e. it was a clear, transparent, flammable solid having a molecular weight between 70,000 and 150,000. A sample of the polystyrene alone and samples of the polystyrene having an organic bromide incorporated therewith were separately injection molded, at a molding temperature of 210° C., to form test bars suitable for use in determining properties of the molded materials. A molding of polystyrene alone was clear, colorless, and transparent, but flammable. Moldings from the compositions of polystyrene and the organic bromides were, in all instances, clear and transparent, possessed a yellow to brown tint, and were non-flammable. When heated in an open flame, they melted and charred somewhat, but they ceased to burn within a few seconds after removal of the flame. Moldings of each of the materials were used to determine the impact strength, tensile strength and heat distortion temperatures of the molded materials. The Izod impact strength was determined in usual manner, except that two test bars, each 1¼ inches long and of ⅛ by ⅛ inch square cross section were placed side by side and were struck simultaneously, on one face of each, by the hammer used for breaking the same. Each impact value given in the table is the inch-pounds of energy required to break the two bars. Each tensile strength value was determined under standard test conditions using a test piece of $\frac{1}{10}$ by $\frac{1}{10}$ inch square cross section in the portion thereof subjected to breakage. The heat distortion temperature values were determined by the procedure of Heirholzer and Boyer, ASTM Bulletin No. 134 of May, 1945. Table I identifies each molded material by naming the organic bromide present in the polystyrene composition used to form the same. In the instance in which no organic bromide is present, the molded material is polystyrene alone. The table gives the properties which were determined for each molded material.

*Table I*

| Expt. No. | Organic Bromides in Polystyrene | Properties of Molded Product | | |
|---|---|---|---|---|
| | | Impact Strength, inch-lbs. | Tensile Strength, lbs./sq. in. | Heat Distortion, Temp., °C. |
| 1 | None | 1.5 | 9,100 | 78 |
| 2 | alpha, beta-dibromo-ethylbenzene | 1.4 | 7,440 | 73.7 |
| 3 | 1,2-di-(dibromomethyl) benzene | 1.4 | 7,610 | 81 |
| 4 | di-(alpha, beta-dibromo-ethyl) benzene | 1.1 | 8,760 | 76 |
| 5 | 1,2,3-tribromobutane | 1.2 | 7,480 | 76 |
| 6 | 2,3-dibromopropanol | 1.8 | 8,070 | 77 |

EXAMPLE 3

Table II, below, lists other of the non-flammable molding compositions provided by the invention. The table names and gives the relative proportions of the ingredients of each composition. The compositions are made by a procedure similar to that described in Example 1, i. e. a non-uniform mixture of the starting materials is fed to an extrusion device where it is heated to plastify the resin ingredient and milled or kneaded to cause uniform incorporation of the other ingredients in the resin. The resultant composition is extruded from the device. All of the compositions listed in the table are non-flammable, colorless, or nearly colorless, clear, transparent solids which may be molded to form articles having similar properties. Each resin listed in the table is, of itself, a flammable solid.

Table II

| No. | Resin | | Organic Bromide | | Stabilizer | |
|---|---|---|---|---|---|---|
| | Kind | Percent | Kind | Percent | Kind | Percent |
| 1 | Polystyrene | 97 | 1,2-di-(dibromo-methyl) benzene. | 2 | Sodium tripoly-phosphate | 1.0 |
| 2 | do | 96.3 | do | 3 | do | 0.7 |
| 3 | do | 94.5 | do | 5 | do | 0.5 |
| 4 | do | 89.8 | do | 10 | do | 0.2 |
| 5 | do | 96.3 | alpha,beta-dibromo-ethyl-benzene. | 3 | Disodium salt of calcium chelate of versene acid. | 0.7 |
| 6 | do | 95.0 | do | 3 | Tetraphenyl tin; 2,6-di-(tert.-butyl)-4-methyl-phenol. | 1.0 |
| 7 | do | 96.3 | do | 3 | Sodium tripoly-phosphate | 0.7 |
| 8 | do | 94.3 | do | 5 | Tetra-lead pyro-phosphate | 0.7 |
| 9 | do | 94.3 | do | 5 | Sodium lead poly-phosphate. | 0.7 |
| 10 | do | 94.3 | do | 5 | Dilithium salt of versene acid. | 0.7 |
| 11 | do | 94.3 | do | 5 | Tetraphenyl tin | 0.7 |
| 12 | do | 94.3 | do | 5 | 2,6-di-(tert.-butyl)-4-methylphenol. | 0.7 |
| 13 | do | 94.3 | do | 5 | Benzoic acid | 0.7 |
| 14 | do | 94.3 | do | 5 | Methyl p-hydroxy-benzoate. | 0.7 |
| 15 | Polymer of ar-methylstyrene. | 94.3 | do | 5 | Sodium tripoly-phosphate | 0.7 |
| 16 | Copolymer of 80% styrene and 20% alpha-methylstyrene. | 94.3 | do | 5 | do | 0.7 |
| 17 | Copolymer of 60% styrene and 40% ar-chlorostyrene. | 94.3 | do | 5 | do | 0.7 |
| 18 | Copolymer of 98% styrene and 2% 1,3-butadiene. | 94.3 | do | 5 | do | 0.7 |

Other modes of applying the principle of the invention may be employed instead of those explained, change being made as regards the method or compositions herein disclosed, provided the steps or ingredients stated by any of the following claims or the equivalent of such stated steps or ingredients be employed.

We therefore particularly point out and distinctly claim as our invention:

1. A non-flammable molding composition comprising: (1) at least 80 per cent by weight of a thermoplastic polymer comprising in chemically combined form at least 50 per cent by weight of at least one alkenyl aromatic compound having the general formula:

$$Ar-\overset{R}{\underset{|}{C}}=CH_2$$

wherein Ar represents an aromatic radical of the group consisting of hydrocarbon and halohydrocarbon radicals of the benzene series and R is a member of the group consisting of hydrogen and the methyl radical, (2) from 3 to 10 per cent of at least one polyhalogenated alkyl aromatic hydrocarbon of the benzene series containing from 8 to 10 carbon atoms in the molecule and having at least two, but not all, of the hydrogen atoms of each alkyl radical replaced by bromine and containing at least one such brominated alkyl radical in the molecule, and (3) from 0.2 to 2 per cent of a stabilizer for the organic bromide.

2. A non-flammable molding composition comprising: (1) at least 80 per cent by weight of a thermoplastic polymer comprising in chemically combined form at least 50 per cent by weight of at least one alkenyl aromatic compound having the general formula:

$$Ar-\overset{R}{\underset{|}{C}}=CH_2$$

wherein Ar represents an aromatic radical of the group consisting of hydrocarbon and halohydrocarbon radicals of the benzene series and R is a member of the group consisting of hydrogen and the methyl radical, (2) from 3 to 10 per cent of alpha,beta-dibromoethylbenzene and (3) from 0.2 to 2 per cent of a stabilizer for the dibromoethylbenzene.

3. A non-flammable molding composition comprising: (1) at least 80 per cent by weight of polystyrene, (2) from 3 to 10 per cent of alpha,beta-dibromoethylbenzene and (3) from 0.2 to 2 per cent of a stabilizer for the dibromoethylbenzene.

4. A non-flammable molding composition comprising: (1) at least 80 per cent by weight of polystyrene, (2) from 3 to 10 per cent of alpha,beta-dibromoethylbenzene and (3) from 0.5 to 1 per cent of tetraphenyl tin.

5. A non-flammable molding composition comprising: (1) at least 80 per cent by weight of polystyrene, (2) from 3 to 10 per cent of 1,2-di-dibromomethyl) benzene, and (3) from 0.2 to 2 per cent of a stabilizer for the 1,2-di-(dibromomethyl) benzene.

References Cited in the file of this patent

UNITED STATES PATENTS

| Number | Name | Date |
|---|---|---|
| 1,985,771 | Eichengrun | Dec. 25, 1934 |

FOREIGN PATENTS

| Number | Country | Date |
|---|---|---|
| 554,602 | Great Britain | July 12, 1943 |